Patented June 2, 1936

2,042,465

UNITED STATES PATENT OFFICE 2,042,465

PROCESS FOR DEINKING PAPER PRINTED WITH OXIDIZABLE INKS

Pierre R. Hines, Portland, Oreg.

No Drawing. Application September 30, 1935, Serial No. 42,881

8 Claims. (Cl. 92—20)

My invention is especially designed to provide a process for deinking uncoated waste paper imprinted with inks having linseed oil, or similar oxidizable oil as their liquid medium.

Uncoated paper printed with ink in which linseed, or similar oxidizing oils constitutes the liquid medium, presents considerable difficulty in the removal of the ink. The reason for this is the oil constituent of the ink, having been dried by oxidation, forms a tough, leathery skin or film over the ink and underlying surface, which greatly impedes th loosening of the ink from the surface; especially where the paper to be deinked has large sections imprinted with illustrations or advertisements using more or less large type.

In order to break down this oxidized oil film, it is necessary that the same be further oxidized until it is disintegrated to the extent of being rendered crumbly, at which stage the ink readily separates from the paper. But such further oxidation of the film of oil unaided is too slow for practical purposes, in the recovery of pulp from imprinted waste paper. I have discovered that such further oxidation of the oil constituent of the ink may be expeditiously accomplished, after the paper has received the usual initial treatment for rendering its size constituent soluble by saponification and leaching, by two modes of procedures, one of which I will designate "Open air method", and the other "Tank method"; the latter, however, being quicker, and therefore the better process.

The open air method consists in shredding the paper and dissolving, and leaching out, the size constituents of the shreds by an alkaline liquor, which may be made up of from 40–60 lbs. of caustic soda (or its equivalent) per ton of air dried paper, and the liquor should preferably be heated to about 200° F. The liquor is then removed, after which the shreds, which still retain considerable of the alkaline liquor, are maintained moist and exposed to the air for further oxidation of the oil film, until brown spots appear on the shreds. Then the shreds must be further covered with a weak alkaline solution, containing not to exceed 20 lbs. of caustic soda per ton of air dried paper being treated; the shreds being entirely covered with the solution so as to exclude further direct contact with the air; and this step is continued until particles of ink carried by samples of the shreds taken from the solution may be readily detached by slight brushing, as by the finger tips. To carry out this process of further oxidizing the oil film, as mentioned, takes about 48 hours. The deinking is then completed by defiberizing the shreds and removing the ink particles therefrom by any convenient further treatment. The latter step may be done by washing, or by the flotation process, as described in my United States Patent No. 2,005,742, dated June 25, 1935, entitled Process for deinking imprinted paper.

If flotation process is to be used, it is advisable that the residual soap content in the treated paper mass be reduced—by filtering, or draining, followed by washing—to flotation requirements, as pointed out in my said patent, before defiberization step.

The tank method may be carried out as follows: Shredding the paper and saponifying, and leaching out, its size constituent by a suitable alkaline liquor, in similar manner as above described with regard to this step in what I have designated my "Open air method."

The next step is to cover the shreds with a weak alkaline solution, preferably lukewarm, and containing not to exceed 20 lbs. of caustic soda per ton of air dried paper being treated, and oxygenating such alkaline solution. The weak alkaline solution may also be obtained by using an alkaline liquor, for the saponifying step, having a slight excess above saponification requirement, and again covering the shreds with sufficient water, after the saponifying liquor has been drained off. The required excess is obtained if the alkaline liquor used for accomplishing the saponifying and leaching step is made up of 3% of caustic soda, or its equivalent, per ton of air dried paper being treated.

The oxygenation of the said weak alkaline solution effects the required oxidation of the oil constituent of the ink, so as to render it crumbly, and readily detachable from the paper shreds, as mentioned. During this oxidation process, the shreds must be maintained in a loose condition, that is prevented from settling in a compact mass, so that both the weak alkaline solution and the oxygen passed thru the same may have an intimate contact with the shreds. A simple way of effecting this result is to oxygenate said weak alkaline solution by passing air under pressure therethru, thus incidentally producing sufficient agitation to prevent the paper shreds from settling into a compact mass, and assuring the more intimate exposure of the shreds to the solution and the oxygen passed thru the solution. This step must be continued until a sample of the shreds taken from the solution shows the shreds to be limp and the ink particles carried thereby readily detachable by slight brushing, as by the tips of the fingers. The sample of shreds may show that their integrity is more or less retained, and the imprintment upon the shreds may still be discernible; but, nevertheless, if the oxidation of the oil constituent of the ink film has been carried to the proper degree, the ink particles may be readily detached by slight brushing, as mentioned.

This tank method, if the liquid be maintained lukewarm, takes about 45 minutes.

The final procedure is then to defiberize the shreds, and remove the ink particles therefrom by any convenient treatment, washing or flotation, the same as mentioned in the description of my open air method.

The described steps for carrying out my invention both as the open air method or a tank method may be accomplished by the use of any convenient equipment or apparatus as found in paper mills; the apparatus used being merely a matter of expediency. But no device should be employed in the defiberization of the shreds, nor in the detachment of the ink particles which would have any tendency to impound the ink particles into the fiber being recovered.

For example, vigorous mechanical agitation in a tank equipped with a ship-propeller type of agitator will effect complete defiberization of the shreds, and free the ink particles from the fibers, whereas refiners which rely upon pounding, rather than a brushing action, tend to impress the particles into the broomed-out portions of the fibers, thus mechanically interlocking the ink particles with, and preventing their later separation from the fibers.

The term "caustic soda" as used in this specification is to be understood as including its equivalent in any other alkali, or combination of alkalies, forming a soluble soap with the size constituents of the paper, within the operating range of temperatures of the liquors employed for that purpose. And the temperatures indicated are merely convenient ones for accelerating the process, since colder temperatures tend to retard the process.

The term "suitable alkaline solution" in the claims is to be understood as defining any solution made of such percentage of caustic soda, or its equivalent, as will meet the requirement of any grade, or mixed grades of paper treated.

Due to the variable nature of waste papers, a suitable alkaline solution is one with a safe margin of free alkaline present for carrying out my process, and about 20 lbs. of caustic soda, or its equivalent, per ton of paper treated, furnishes this margin. However, in deinking low sized magazines and other waste paper, 5 to 10 lbs. of caustic soda per ton of paper treated is generally sufficient for carrying out my process; and rarely, even with hard sized waste papers, is an excess of 20 lbs. of caustic per ton of paper required, but, as a rule, only increases the consumption of alkali, with no corresponding benefit.

I claim:

1. The process of deinking paper imprinted with an ink having an oxidizing oil constituent which consists in shredding the paper, dissolving out its size constituent by a suitable liquor, removing the liquor, then maintaining the shreds in loose condition and moist with a weak alkaline solution and exposed to the air until brown spots appear on the shreds, then again covering the shreds with a weak alkaline solution and so as to exclude further direct contact with the air, until particles of ink carried by a sample of the shreds may be readily detached by slight brushing, then defiberizing the shreds and removing the ink particles therefrom by any convenient further treatment.

2. The process of deinking paper imprinted with an ink having an oxidizing oil constituent, which consists in shredding the paper and saponifying its size constituent by a suitable alkaline liquor, removing the liquor, covering the shreds with a suitable alkaline solution, oxygenating said alkaline solution and maintaining the shreds in a loose condition, thus assuring the more intimate exposure of the shreds to the oxygen passed thru the solution, continuing this step until a sample of the shreds taken from the solution shows the shreds to be limp, and the ink particles carried by the shreds are readily detached by slight brushing, defiberizing the shreds, and removing the ink particles therefrom by any further convenient treatment.

3. The process of deinking paper imprinted with an ink having an oxidizing oil constituent, which consists in shredding the paper and saponifying its size constituent by a suitable alkaline liquor, removing the liquor, covering the shreds with a suitable lukewarm alkaline solution, oxygenating said alkaline solution and maintaining the shreds in a loose condition, thus assuring the more intimate exposure of the shreds to the oxygen passed thru the solution, continuing this step until a sample of the shreds taken from the solution shows the shreds to be limp and the ink particles carried by the shreds are readily detached by slight brushing, defiberizing the shreds, and removing the ink particles therefrom by any further convenient treatment.

4. The process of deinking paper imprinted with an ink having an oxidizing oil constituent, which consists in shredding the paper and saponifying its size constituent by a suitable alkaline liquor, removing the liquor, covering the shreds with an alkaline solution containing not to exceed approximately 20 lbs. of caustic soda, or its equivalent, per ton of air dried paper being treated, oxygenating said alkaline solution and maintaining the shreds in a loose condition, thus assuring the more intimate exposure of the shreds to the oxygen passed thru the solution, continuing this step until a sample of the shreds taken from the solution shows the shreds to be limp, and the ink particles carried by the shreds are readily detached by slight brushing, defiberizing the shreds, and removing the ink particles therefrom by any further convenient treatment.

5. The process of deinking paper imprinted with an ink having an oxidizing oil constituent, which consists in shredding the paper and saponifying its size constituent by a suitable alkaline liquor, removing the liquor, covering the shreds with a lukewarm alkaline solution containing not to exceed approximately 20 lbs. of caustic soda, or its equivalent, per ton of air dried paper being treated, oxygenating said alkaline solution and maintaining the shreds in a loose condition, thus assuring the more intimate exposure of the shreds to the oxygen passed thru the solution, continuing this step until a sample of the shreds taken from the solution shows the shreds to be limp, and the ink particles carried by the shreds are readily detached by slight brushing, defiberizing the shreds, and removing the ink particles therefrom by any further convenient treatment.

6. The process of deinking paper imprinted with an ink having an oxidizing oil constituent, which consists in shredding the paper and saponifying its size constituent by a suitable alkaline liquor, removing the liquor, covering the shreds with a suitable lukewarm alkaline solution, oxygenating said alkaline solution by passing air under pressure therethru, thereby incidentally preventing the paper shreds from settling into a compact mass, thus assuring the more intimate exposure of the shreds to the oxygen passed thru the solution, continuing this step until a sample of the shreds taken from the solution shows the shreds to be limp, and the ink particles carried by the shreds are readily detached by slight brushing, defiberizing the shreds, and removing the ink particles therefrom by any further convenient treatment.

7. The process of deinking paper imprinted with an ink having an oxidizing oil constituent, which consists in shredding the paper and saponifying its size constituent by a suitable alkaline liquor, with the liquor so proportioned as to leave a slight excess above saponification requirement, removing the liquor, covering the shreds with sufficient water to form with the alkali retained by the shreds a weak alkaline solution, oxygenating said alkaline solution and maintaining the shreds in a loose condition, thus assuring the more intimate exposure of the shreds to the oxygen passed thru the solution, continuing this step until a sample of the shreds taken from the solution shows the shreds to be limp, and the ink particles carried by the shreds are readily detached by slight brushing, defiberizing the shreds, and removing the ink particles therefrom by any further convenient treatment.

8. The process of deinking paper imprinted with an ink having an oxidizing oil constituent, which consists in shredding the paper and saponifying its size constituents by a suitable alkaline liquor, with the liquor so proportioned as to leave a slight excess above saponification requirement, removing the liquor, covering the shreds with sufficient water to form with the alkali retained by the shreds a weak alkaline solution, oxygenating said alkaline solution by passing air under pressure therethru, thereby incidentally preventing the paper shreds from settling into a compact mass, thus assuring the more intimate exposure of the shreds to the oxygen passed thru the solution, continuing this step until a sample of the shreds taken from the solution shows the shreds to be limp, and the ink particles carried by the shreds are readily detached by slight brushing, defiberizing the shreds, and removing the ink particles therefrom by any further convenient treatment.

PIERRE R. HINES.